United States Patent [19]

Smith

[11] 3,996,460

[45] Dec. 7, 1976

[54] SOLAR TRACKING CONTROL SYSTEM USING SHADOW DETECTION

[76] Inventor: Peter D. Smith, 1912 Kathryn Court, Bakersfield, Calif. 93308

[22] Filed: Dec. 3, 1975

[21] Appl. No.: 637,143

[52] U.S. Cl. .......................... 250/203 R; 250/209; 350/152

[51] Int. Cl.² .......................................... G01J 1/20

[58] Field of Search ............... 250/203, 237 R, 209; 356/141, 152

[56] References Cited

UNITED STATES PATENTS

| | | | |
|---|---|---|---|
| 3,515,594 | 6/1970 | Samuels | 250/203 R |
| 3,780,966 | 12/1973 | Newcomb, Jr. et al. | 250/203 R |
| 3,917,942 | 11/1975 | McCay | 250/203 R |

*Primary Examiner*—Alfred E. Smith
*Assistant Examiner*—David K. Moore
*Attorney, Agent, or Firm*—William W. Haefliger

[57] ABSTRACT

A control system for radiation tracking apparatus comprises:

a. a shadow box having a window, b. four photo sensors located within the box to receive incident radiation passing through the window, c. first and second sensors respectively having upper and lower locations to provide outputs controlling elevational tracking movement of said apparatus, and d. third and fourth sensors respectively having left and right locations to provide outputs controlling azimuthal tracking movement of said apparatus.

13 Claims, 4 Drawing Figures

SOLAR TRACKING CONTROL SYSTEM USING SHADOW DETECTION

BACKGROUND OF THE INVENTION

This invention relates generally to radiation tracking control systems; more specifically, it concerns a simple, effective radiation or solar tracking system which is shadow seeking rather than direct sunlight seeking.

Prior solar tracking controls have suffered from excess complexity, as well as erratic performance. The latter was in some cases due to a design which required that the sensors seek sunlight incidence thereon. In addition, none of such prior controls met all of the following requirements, to my knowledge:

A. Economical production components;

B. Simple circuitry and absence of sophisticated electronic components;

C. Absence of refracting optics;

D. Complete servicability by existing skills of heating-cooling system service personnel;

E. High accuracy within practical and useful limits;

F. The ability to ignore light sources other than the sun.

SUMMARY OF THE INVENTION

It is a major object of the invention to overcome prior problems and meet all of the above requirements, through provision of an unusually advantageous radiation tracking control system employing a shadow seeking principle of operation. Basically, the control system includes the following elements:

a. a support, b. means on the support having spaced radiation cut-off edges, thereby to produce at least two spaced shadow lines, c. at least two photo sensors carried by the support so that the shadow lines effectively cross the respective sensors, the sensors having outputs, d. and drive means for the support and connected with the sensor outputs to drive the support in directions such that each sensor seeks its shadow line.

Further, and as will appear, the means providing the cut-off edges may comprise a shadow box having a window supporting four adjustable shadow line producing edges, there being four corresponding photo sensors for both azimuthal and elevational control; each sensor may advantageously include a photocell, and a gradient density filter and darkening wafer in the path of radiation transmission to the photocell; the drive means may include a primary drive connected with the first and second photocell, and a secondary drive connected with the third and fourth photocells; and each such drive may include two DPDT relays interconnected with the two photocells in the simple manner to be described.

These and other objects of the invention, as well as the details of an illustrative embodiment, will be more fully understood from the following description and drawings, in which:

DRAWING DESCRIPTION

DETAILED DESCRIPTION

Figure 1:
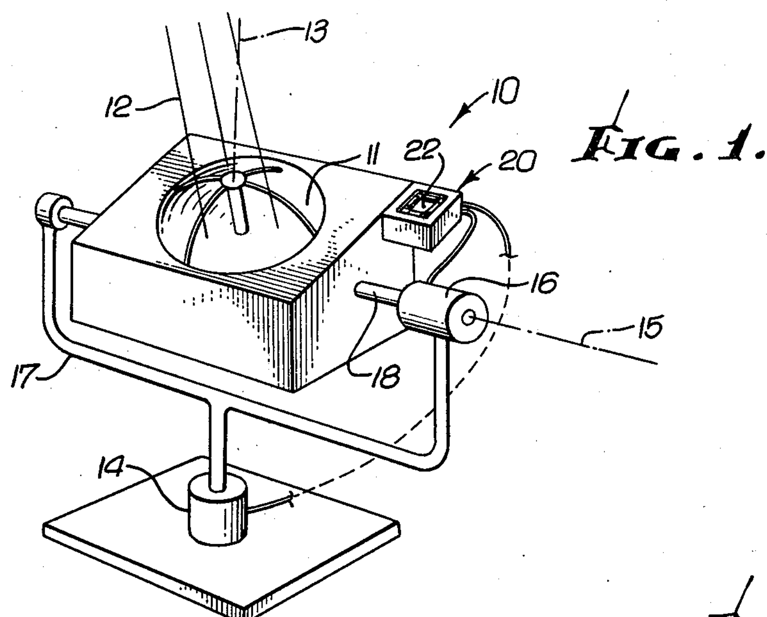
FIG. 1 is a perspective view of equipment for tracking the sun.

Referring first to FIG. 1, apparatus 10 is adapted to track the sun as it passes overhead. Such apparatus may take any form, such as, for example, a solar heater having a means such as a parabolic reflector type solar collector 11 receiving impingement of the sun's rays 12. The apparatus may be rotated about a vertical axis 13 as by motor 14, and also about a horizontal axis 15 as by motor 16 to accomplish such tracking, and for this purpose the motor 16 is carried by a U-shaped frame 17 that is in turn rotated about axis 13 by motor 14. Motor 16 rotates a shaft 18 about axis 15, the shaft supporting apparatus 10. This description is merely to illustrate one way of effecting azimuthal tracking and elevational tracking of the sun's rays by apparatus 10.

Figure 2:
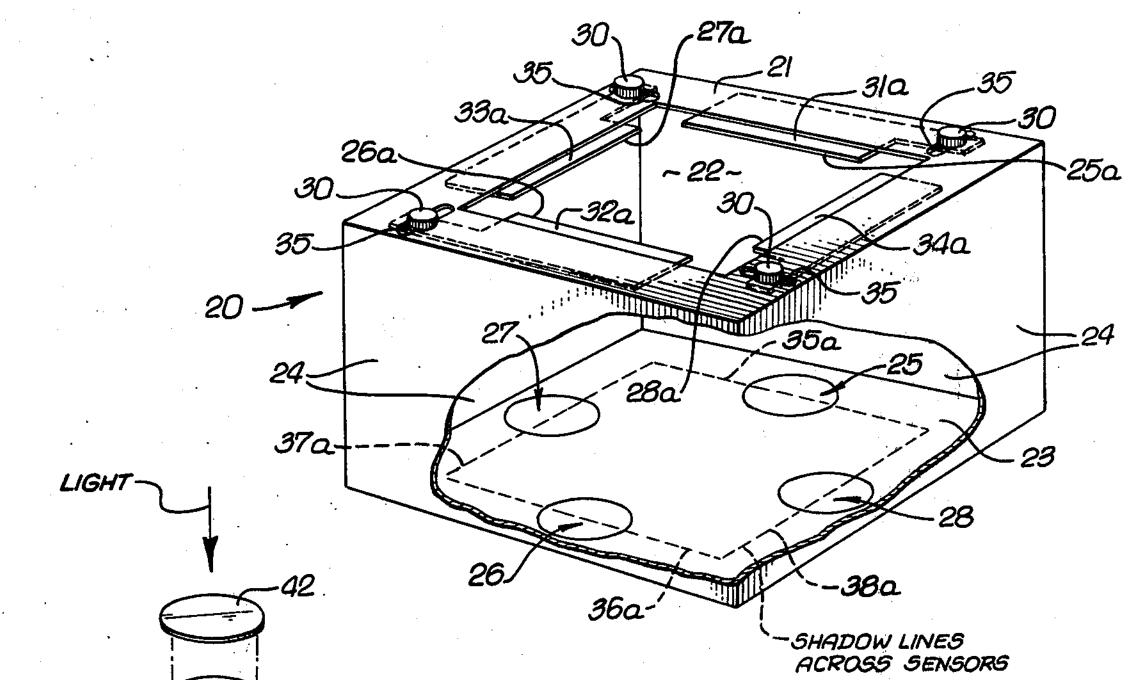
FIG. 2 is a perspective view, partly broken away, showing a shadow box.

In accordance with the invention a control system is provided to control such azimuthal and/or elevational tracking. That system includes a shadow box 20 which may for example move with apparatus 10, and for that purpose may be mounted to the apparatus as is seen in FIG. 1. The box, as also seen in FIG. 2, typically has a front wall 21 containing a rectangular window 22, a rear wall 23, and four side walls 24. Four photo sensors schematically shown at 25–28 are located within the box to receive incident radiation, as for example sunlight, passing through the window. First and second sensors 25 and 26 respectively have upper and lower locations and outputs controlling elevational tracking movement of the box 20 as well as apparatus 10; and, third and fourth sensors 27 and 28 have left and right locations to provide outputs controlling azimuthal tracking movement of the box 20 and apparatus 10.

Generally speaking, the window has edges, as for example at *25a*, *26a*, *27a* and *28a* (corresponding to the photo sensors) which are located to variably cut-off direct incidence of radiation on certain sensors in response to relative azimuthal and elevational rotation between the box and the direction of radiation transmission, thereby to alter the outputs of said certain sensors; further, the control system includes means responsive to such altered outputs to control the tracking movement of the box and apparatus 10. The edges *25a* and *26a* are vertically spaced and extend in parallel, left to right, whereas edges *27a* and *28a* are laterally spaced and extend in vertical parallel relation. Means such as fasteners 30 retain the edge-defining plates *31a–34a* to the front wall 21, the fasteners extending through slots 35 in that wall to allow adjustment shifting of edges *25a* and *26a* up and down, and adjustment shifting of edges *27a* and *28a* left and right. Accordingly, the positions of shadow lines *35a–38a* produced by the respective edges to extend across the sensors may be shifted relative to the sensors, for calibration. The edges *25a* and *26a* are shown to extend generally at right angles to edges *27a* and *28a*, whereby the four edges extend generally rectangularly.

Figure 3:
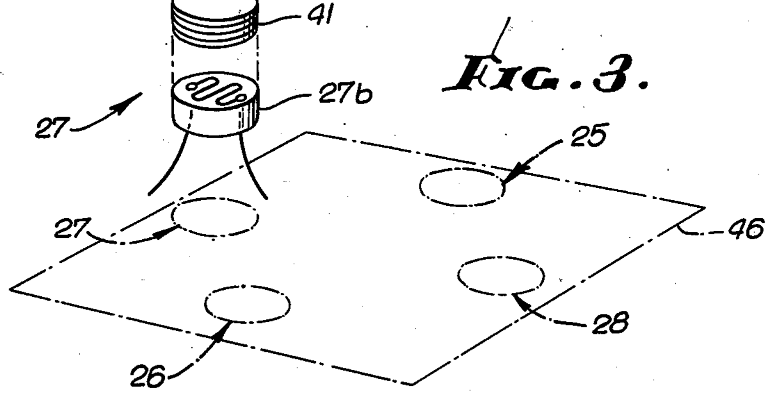
FIG. 3 is an exploded view of a photo sensor as used in the shadow box.

Referring now to FIG. 3, at least one photo sensor (as shown in axially exploded arrangement) and preferably each photo sensor, includes a photocell *27b*, a gradient density filter disc or pack 41 in the path of radiation transmission to the cell, and a darkening wafer 42.

Figure 4:
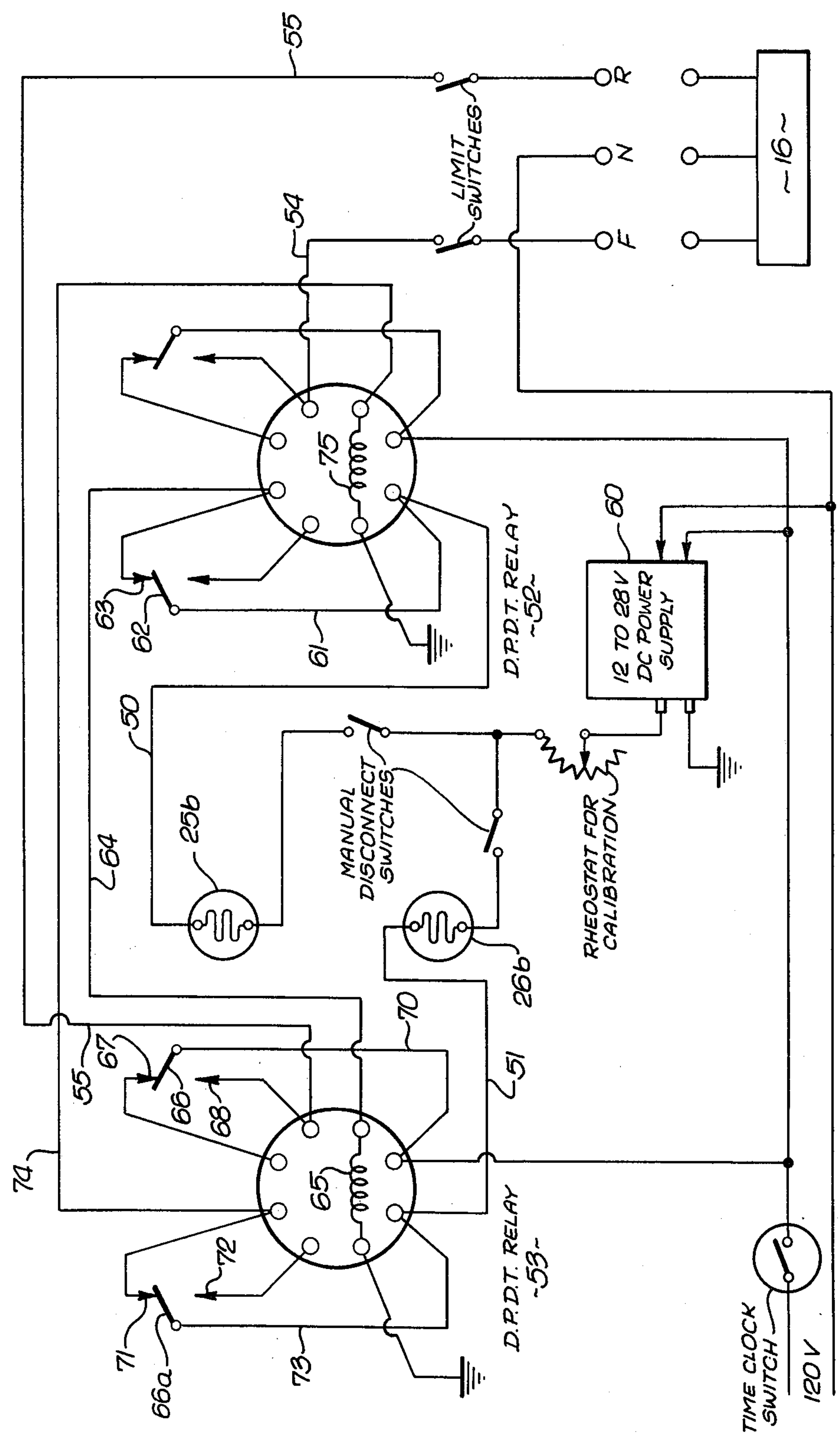
FIG. 4 is a sensor wiring diagram.

Referring to FIG. 4, the two photocells *25b* and *26b*, associated for example with the photo sensors 25 and 26 respectively, are connected at 50 and 51 with the double pole double throw relays 52 and 53, respectively. The output of relay 52 is provided on lead 54 connected to forward F-terminal, and the output of relay 53 is provided on lead 55 connected to reverse R terminal. These terminals supply forward or reverse AC current to the drive motor 16, controlling up and down pivoting of the box. Similarly, the two photocells 27*b* and 28*b* may be connected to motor 14 to control left and right pivoting of the box 20 and apparatus 10.

Referring again to FIG. 3, the gradient density filter pack 41 is made up of layers of opaque material. By adding or removing layers of the material the adjustment is made to regulate the percentage of available light impressed upon the photo cell. In addition to this set filter pack, the wafter 42 of ultra-violet sensitive glass is included immediately at the front of the filter set to modulate the amount of light impressed upon the photocell. Wafter 42 is not used optically to refract or reflect light. The ultra-violet sensitive wafer darkens with increased light and lightens with diminished light thereby extending the effective range in light intensities controlling the photo cell within its variable output range. One example of this wafer material is the product known as PHOTOSUN, produced by Dow Corning Glass Co. The exact assembly of the photocell, filter pack and wafer is by design choice, but they are in close proximity to one another.

With this combination of elements in the filter pack, the tracking control is operable throughout the useful range of light intensities encountered in the daily availability from the sun. Periods of dark during the day only lighten the sensitive glass and the control becomes more responsive with the return of a light period.

The gradient density filter pack regulates the amount of light entering the photocell when exposed to the direct rays of the sun. The adjustment of the filter is made to such a density that the associated relay will close only with direct rays entering the photocell. The adjustment is made at the time of assembly.

In view of the above, it is important that the photocell have the ability to differentiate between the intensities of the direct sun's rays and the extraneous light. This is accomplished by means of reducing the intensities of both these light sources to levels that the photocell can react to by providing a definite change in conductance. Normally, without a gradient density filter in front of the photocell, both the direct rays of the sun and the extraneous light would be intense enough for the photo cell to achieve maximum conductance and hence would not signal a change to the relay.

In operation, sunlight entering the window 22 passes through the box and strikes each of the four sensors approximately in the center when the box is directed straight toward the direction of the sun. In this position of the box, the shadow line adjusters 31*a*–34*a* are adjusted by moving them in or out of the position where they will just let the relays remain open. Any movement of the sun relative to the box will then bring enough direct rays to either one or two sensors (in opposite axes) to cause the associated relays to close, thereby energizing the actuators or motors to move the tracking system in the direction of the sun's movement. The shadow box, being fastened directly to the framework of the tracking system, will then keep the tracking system aligned with the sun.

It should be noted that the control system is shadow seeking. Each sensor is energized only when the direct rays of the sun fall directly upon it. The energized sensor activates the associated relay, operating an actuator or motor on the parent machine, which will bring the sensor back into a shadow area in the back of the shadow box. It then deenergizes and the system is at rest. During periods of dark or reduced light, as experienced during cloudy weather, the system is at rest and does not seek a light which is not available. The system activates immediately upon return of direct sunlight and aligns itself to the light source by returning all four sensors to their respective shadow areas within the shadow box.

Referring again to FIG. 4, each photocell must (1) pass enough current to close the associated D.P.D.T. relay when exposed only to the direct rays of the sun, and (2) pass little enough current so as to let the relay open when the shadow line projected from the window crosses the photocell, even though there is considerable extraneous light entering the shadow box.

To these ends, photocell 25*b* is shown connected in a circuit that includes power supply 60, lead 50, lead 61, arm 62, contact 63, lead 64, coil 65 of relay 53, and ground. Accordingly, when the photocell 25*b* conducts sufficiently, relay 53 is operated, i.e., arm member 66 moves to disengage contact 67 and engage contact 68, whereby full line voltage is applied via lead 70, contact 68, and lead 55 to the R-terminal. This means that the shadow box is driven in a direction to cause photocell 25*b* to receive less direct sunlight, i.e., to seek shadow, until relay 53 is deactivated in response to less current output by cell 25*b*. At that time, shadow line 35*a*, cross the sensor 25.

It will be noted that when relay 53 is then activated to drive the motor 16, relay 52 is deactivated. This is effected by virtue of the fact that the circuit of photocell 25*b* is broken when arm member 66 moves downwardly, i.e., the arm member 66*a* also moving downwardly to disengage contact 71 and to engage contact 72, breaking the circuit that includes cell 26*b*, lead 51, lead 73, contact 71, lead 74, and coil 75 or relay 52. Accordingly, when the motor is energized to move in one direction, it cannot be energized to move in the opposite direction, and vice versa.

Finally, the sensor outputs can alternatively be connected to control fluid valves, as for example hydraulic, air or steam valves.

I claim:

1. In a control system for radiation tracking apparatus, a. a shadow box having a window, b. four photo sensors located within the box to receive incident radiation passing through the window, c. first and second of the sensors respectively having upper and lower locations to provide outputs controlling elevational tracking movement of said apparatus, and d. third and fourth of the sensors respectively having left and right locations to provide outputs controlling azimuthal tracking movement of said apparatus, e. said window having first and second adjusted edges which are located to variably cut-off direct incidence of radiation on the first and second sensors respectively in response to relative elevational rotation between the box and the direction of radiation transmission, thereby to alter the outputs of said first and second sensors, and said window having third and fourth adjusted edges which extend generally at right angles to said first and second edges to variably cut-off direct incidence of radiation on the third and fourth sensors respectively in response to relative azimuthal rotation between the box and the direction of radiation transmission, thereby to alter the outputs of the third and fourth sensors, the control system including means responsive to said altered outputs to control said tracking movement.

2. The system of claim 1 wherein said window edges are arranged to extend generally rectangularly and in correspondence to the arrangement of said sensors.

3. The system of claim 2 including means to adjust said edges relative to the box and to positions characterized in that radiation entering said window simultaneously impinges on only a portion of each of the four sensors.

4. The system of claim 2 wherein the edges have positions defining shadow lines simultaneously extending across the four sensors, respectively.

5. The system of claim 1 wherein each photo sensor includes a photocell and a gradient density filter in the path of radiation transmitted to the photocell to regulate the amount of radiation reaching the photocell.

6. The system of claim 5 wherein each photo sensor also includes an ultra-violet darkening wafer in the path of light transmitted to the photocell.

7. The system of claim 6 wherein said darkening wafer operates to modulate the light input to the photocell, and is located at the light input side of the filter.

8. The system of claim 6 wherein said filter is located in close proximity to said photocell, and said darkening wafer is located in close proximity to said filter and the cell.

9. The system of claim 1 including a solar heat collector coupled to said system to track the sun's relative movement.

10. The system of claim 1 wherein said last named means includes primary and secondary drives, the primary drive connected with the first and second sensors, and the secondary drive connected with the third and fourth sensors.

11. The system of claim 10 wherein the primary drive includes a primary motor, and two DPDT relays having inputs connected with the first and second sensors and outputs connected with the motor.

12. The system of claim 11 wherein the secondary drive includes a secondary motor, and two DPDT relays having inputs connected with the third and fourth photo sensors and outputs connected with the secondary motor.

13. In a control system for radiation tracking apparatus, said radiation including light, a. a support, b. means on the support having spaced radiation cut-off edges, thereby to produce at least two spaced shadow lines, c. at least two photo sensors carried by the support so that the shadow lines effectively cross the respective sensors at the same time, the sensors having outputs, d. and drive means for the support and connected with the sensor outputs to drive the support in directions such that each sensor seeks its shadow line, e. each sensor including a photocell and a gradient density filter in the path of radiation transmitted to the photocell to regulate the amount of radiation reaching the photocell, each sensor also including an ultra-voilet darkening wafer in the path of light transmitted to the photocell.

* * * * *

UNITED STATES PATENT OFFICE

CERTIFICATE OF CORRECTION

PATENT NO. : 3,996,460

DATED : December 7, 1976

INVENTOR(S) : Peter D. Smith

It is certified that error appears in the above-identified patent and that said Letters Patent are hereby corrected as shown below:

Column 3, line 12; "set filter pack, the wafter 42 of ultra-violet sensitive" should read --set filter pack, the wafer 42 of ultra-violet sensitive--

Column 3, line 15; "photocell. Wafter 42 is not used optically to refract or" should read --photocell. Wafer 42 is not used optically to refract or--

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*